(12) United States Patent
Lippert et al.

(10) Patent No.: US 9,360,104 B1
(45) Date of Patent: Jun. 7, 2016

(54) DRIVELINE THERMAL AND LUBRICANT FLOW MANAGEMENT

(71) Applicant: Ford Global Technologies, LLC, Dearborn, MI (US)

(72) Inventors: Robert Scott Lippert, Ann Arbor, MI (US); John Edward Brevick, Livonia, MI (US); Mathew John Fast, Dearborn Heights, MI (US); Lawrence Marshall, St. Claire Shores, MI (US); Andreas E. Perakes, Canton, MI (US); Danrich Henry Demitroff, Okemos, MI (US); W. Cary Cole, Livonia, MI (US); Furqan Zafar Shaikh, Troy, MI (US); Michael Levin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 14/574,899

(22) Filed: Dec. 18, 2014

(51) Int. Cl.
*F16H 57/04* (2010.01)
*F16H 57/031* (2012.01)

(52) U.S. Cl.
CPC .......... *F16H 57/0483* (2013.01); *F16H 57/031* (2013.01); *F16H 57/045* (2013.01); *F16H 57/0413* (2013.01); *F16H 57/0416* (2013.01); *F16H 57/0457* (2013.01)

(58) Field of Classification Search
CPC ............................ F16H 57/0483; F16H 57/031
See application file for complete search history.

(56) References Cited

U.S. PATENT DOCUMENTS

| | | |
|---|---|---|
| 5,505,112 A | 4/1996 | Gee |
| 6,432,018 B1 | 8/2002 | Morse et al. |
| 6,474,405 B1 | 11/2002 | Bell et al. |
| 6,997,284 B1 * | 2/2006 | Nahrwold ........... F16H 57/0447 165/117 |
| 8,485,932 B2 * | 7/2013 | Beechie .................. F01N 5/020 475/161 |
| 8,689,742 B2 * | 4/2014 | Myers ...................... F01P 11/08 123/41.01 |
| 8,715,127 B2 * | 5/2014 | Beutler ................. B60B 35/163 475/161 |
| 8,746,405 B2 | 6/2014 | Perakes et al. |
| 2003/0188932 A1 | 10/2003 | Schneider et al. |
| 2012/0118100 A1 * | 5/2012 | Mordukhovich .. C10M 171/002 74/607 |
| 2012/0279699 A1 * | 11/2012 | Kim ........................ F01P 11/08 165/287 |
| 2014/0157952 A1 * | 6/2014 | Chudy ................ F16H 57/0483 74/606 A |
| 2014/0290922 A1 * | 10/2014 | Palanchon .......... F16H 57/0417 165/168 |
| 2016/0047461 A1 * | 2/2016 | Kelly .................. F16H 57/0483 74/607 |

FOREIGN PATENT DOCUMENTS

| | | |
|---|---|---|
| DE | 102012012837 A1 | 12/2013 |
| EP | 1411263 A2 | 4/2004 |
| EP | 2375107 A1 | 10/2011 |

* cited by examiner

*Primary Examiner* — Sherry Estremsky
(74) *Attorney, Agent, or Firm* — James Dottavio; Brooks Kushman P.C.

(57) ABSTRACT

A vehicle includes axle housing, a differential and a ring gear, a scraper port, and a reservoir. The housing has a cover forming a heat exchanger having a coolant side and a lubricant side. The differential and ring gear are configured to pump a lubricating fluid. The scraper port is disposed at a bottom of the heat exchanger adjacent to the ring gear and is configured to direct the lubricating fluid through the lubricant side of the heat exchanger. The reservoir is disposed at a top of the heat exchanger and is configured to receive and store the lubricating fluid from the lubricant side of the heat exchanger.

20 Claims, 5 Drawing Sheets

DRIVELINE THERMAL AND LUBRICANT FLOW MANAGEMENT

TECHNICAL FIELD

The present invention relates to powertrain cooling and active warm-up systems. It also relates to lubricant fluid management systems.

BACKGROUND

Vehicle driveline components such as gears, bearings, and other elements require lubrication. Various characteristics of the lubricating fluid, such as viscosity, temperature, and fluid levels may affect durability, drivability, and fuel economy. The lubricating fluid may be heated or cooled in order to warm or cool certain vehicle components, such as a transmission. Warming the transmission, for example, may increase the overall vehicle fuel economy.

SUMMARY

A vehicle axle includes a housing, a differential and a ring gear, a scraper port, and a reservoir. The housing has a cover and defines a sump containing a quantity of lubricating fluid. The cover forms a heat exchanger having a coolant side on the exterior of the housing and a lubricant side on the interior of the housing. The differential and ring gear are supported for rotation within the housing and configured to pump the lubricating fluid from the sump. The scraper port is disposed at a bottom of the heat exchanger adjacent to the ring gear and is configured to direct the lubricating fluid through the lubricant side of the heat exchanger. The reservoir is disposed at a top of the heat exchanger and configured to receive and store the lubricating fluid from the lubricant side of the heat exchanger.

A vehicle includes axle housing, a differential and a ring gear, a scraper port, and a reservoir. The housing has a cover forming a heat exchanger having a coolant side and a lubricant side. The differential and ring gear are configured to pump a lubricating fluid. The scraper port is disposed at a bottom of the heat exchanger adjacent to the ring gear and is configured to direct the lubricating fluid through the lubricant side of the heat exchanger. The reservoir is disposed at a top of the heat exchanger and is configured to receive and store the lubricating fluid from the lubricant side of the heat exchanger.

A vehicle differential housing includes a heat exchanger, a scraper, and a reservoir. The heat exchanger has a lubricant side and a coolant side having an inlet port and an outlet port. The scraper is configured to direct a lubricating fluid through the lubricant side of the heat exchanger. The reservoir is configured to receive and store the lubricating fluid from the lubricant side of the heat exchanger.

A method of actively warming a differential includes, in response to producing heat from a heat source fluidly coupled to a reservoir, heating oil disposed within the reservoir configured to store the heat within the oil. The method of actively warming a differential also includes, in response to a demand for heat from the differential, direct, via a valve, an amount of the oil to an inlet port of a differential housing. The oil transfers heat, via a heat exchanger fluidly coupled with the differential housing, to a lubricating fluid within the differential housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Rear wheel drive vehicles require a high viscosity lubricating fluid. A high viscosity lubricating fluid lubricates the bearings, gears, or other components to avoid metal to metal contact between the vehicle components. This helps to reduce damage and improve durability of the vehicle components. The rear differential tends to heat up during higher vehicle loads requiring a higher viscosity lubricating fluid. Higher viscosity lubricating fluids will cause inefficiencies when lubricating vehicle driveline components. For example, with a higher viscosity lubricating fluid, the pump may have a higher parasitic loss (spin loss) in colder environments. Colder environments increase the viscosity of the higher weight lubricating fluid. A highly viscous fluid may be difficult to pump. Difficulties pumping the lubricating fluid result in less fluid flowing to the vehicle components. Having less lubricating fluid flow to the vehicle components results in the components being under-lubricated. Likewise, when the lubricating fluid is hot, the pump may pump too much fluid to the components due to the decreased viscosity. This may result in vehicle driveline components being over-lubricated. When vehicle driveline components, or more specifically the vehicle axle being either the front or rear axles, do not receive enough or receive more than the necessary amount of lubricating fluid, additional wear or spin loss may be imposed on those components. Therefore, temperature and flow management of the lubricant reduces damage to the components and improves the overall fuel economy cost.

A higher viscosity lubricating fluid may also be difficult to warm or cool. As such, the temperature, and therefore the viscosity, of the lubricating fluid may be difficult to control. As stated above, when the temperature of the lubricating fluid is either too hot or too cold, the vehicle components may operate inefficiently. This reduces the overall fuel economy of the vehicle. In order to improve fuel economy, driveline components may be actively warmed or cooled. Optimizing the temperature to control the viscosity optimizes the amount of lubricant used to lubricate the vehicle components. Controlling the flow of the lubricating fluid as well as controlling the temperature of the lubricating fluid ensures constant and efficient lubrication to the vehicle driveline components.

Figure 1:
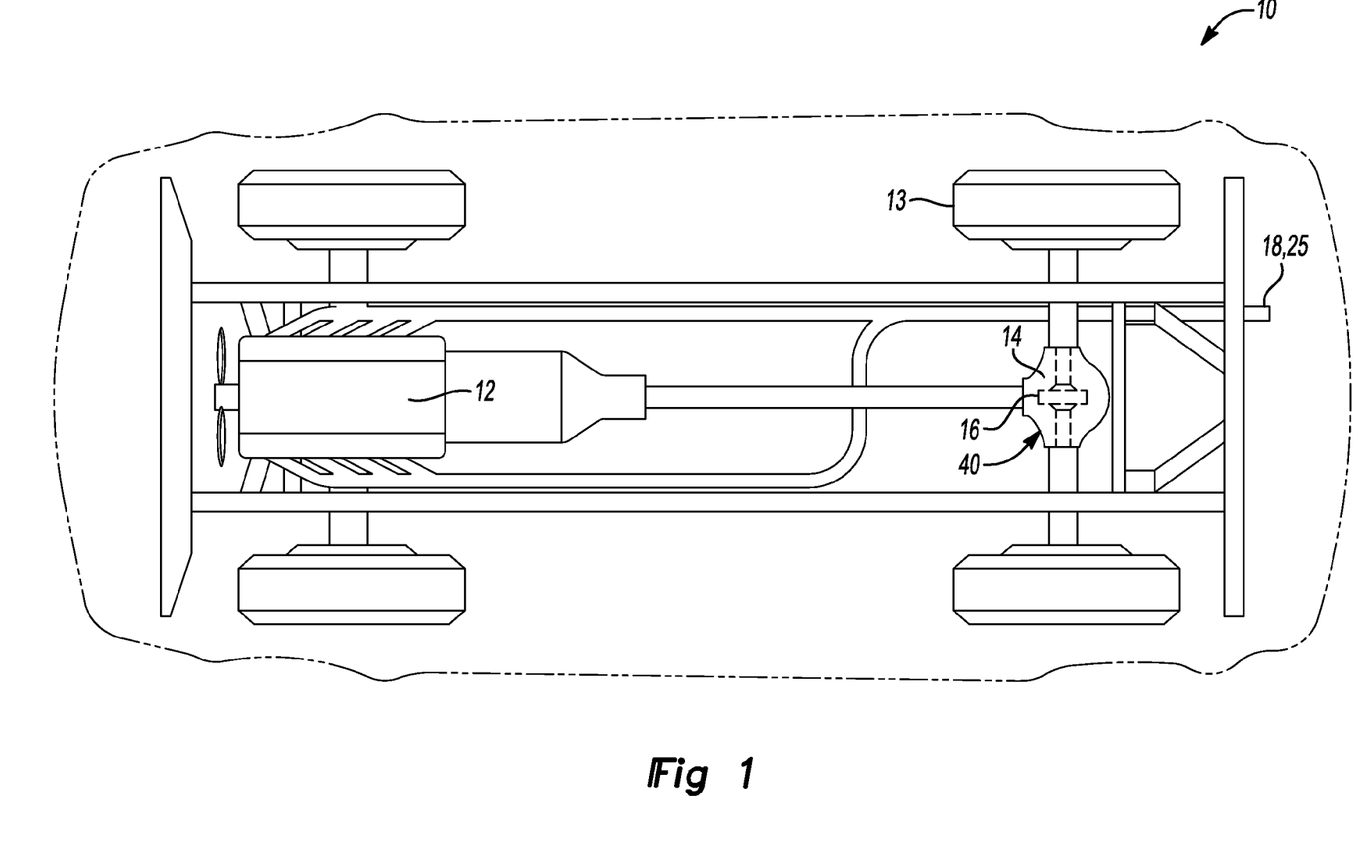
FIG. 1 is a schematic of a vehicle.

Referring to FIG. 1, a schematic of a vehicle 10 is shown. The vehicle 10 includes an engine/transmission 12, a differential 14 which includes a ring gear 16 and a housing 40, and an exhaust system 18. The engine/transmission 12 provides torque. The differential 14 transfers torque from the engine/transmission 12 to the vehicle wheels 13. The ring gear 16 of the differential 14 spins allowing torque from the engine/transmission 12 to be transferred to the wheels 13. The ring gear 16, as it spins, pumps lubricating fluid within the differential 14. Pumping the lubricating fluid exerts some torque on ring gear 16 which decreases the torque transmitted to the wheels 13. This is known as a speed related spin loss. Spin loss occurs when vehicle speed is lost due to increased fluid levels within a sump. When the temperature of the lubricating fluid significantly increases or decreases the viscosity of the lubricating fluid, the ring gear 16 may have a higher spin loss. Therefore, a temperature and flow management system may control the viscosity of the lubricating fluid reducing the spin loss of the ring gear 16.

The engine/transmission 12 produces excess heat. Some of this heat is dissipated through the exhaust system 18. The fluid flow and temperature control management technique of the present disclosure may utilize the heat from the exhaust system 18 as a heat source 25 in order to more quickly heat the lubricating fluid of the differential 14. The heat source 25 may be any system or coolant which functions to transfer heat. While described as a heat source 25, the fluid flow and temperature management technique may also be used to cool the lubricating fluid. As stated above, in certain environments or operating conditions, the lubricating fluid may be either too warm or too cool. Therefore, it may also be advantageous to cool the lubricating fluid. Situations that require cooling may include, but are not limited to, extended heavy load durability, such as towing a trailer, for example. Cooling the lubricating fluid may be done in a similar manner as heating the lubricating fluid. As an example, heating the lubricating fluid will be discussed in more detail below.

As shown in FIG. 1, the heat source 25 is depicted as an engine exhaust system 18, for example. However, the heat source may include other aspects of the vehicle 10 that are capable of transferring heat. Another example of a heat source 25 may be coolant used to heat or cool the engine/transmission 12. Using a heat source 25 to heat the differential lubricating fluid aids in controlling the viscosity of the fluid and helps to actively warm the differential 14. Controlling the viscosity of the fluid aids in optimizing the amount of lubricating fluid flowing to the vehicle components. Therefore, optimizing the temperature of the lubricating fluid controls the viscosity of the fluid and aids in managing the fluid flow to the vehicle components. While shown as a system using the heat source 25 to heat differential lubricating fluids within a differential 14, other vehicle components requiring lubrication may use the heat source 25 to warm the respective lubricating fluids.

Figure 2:
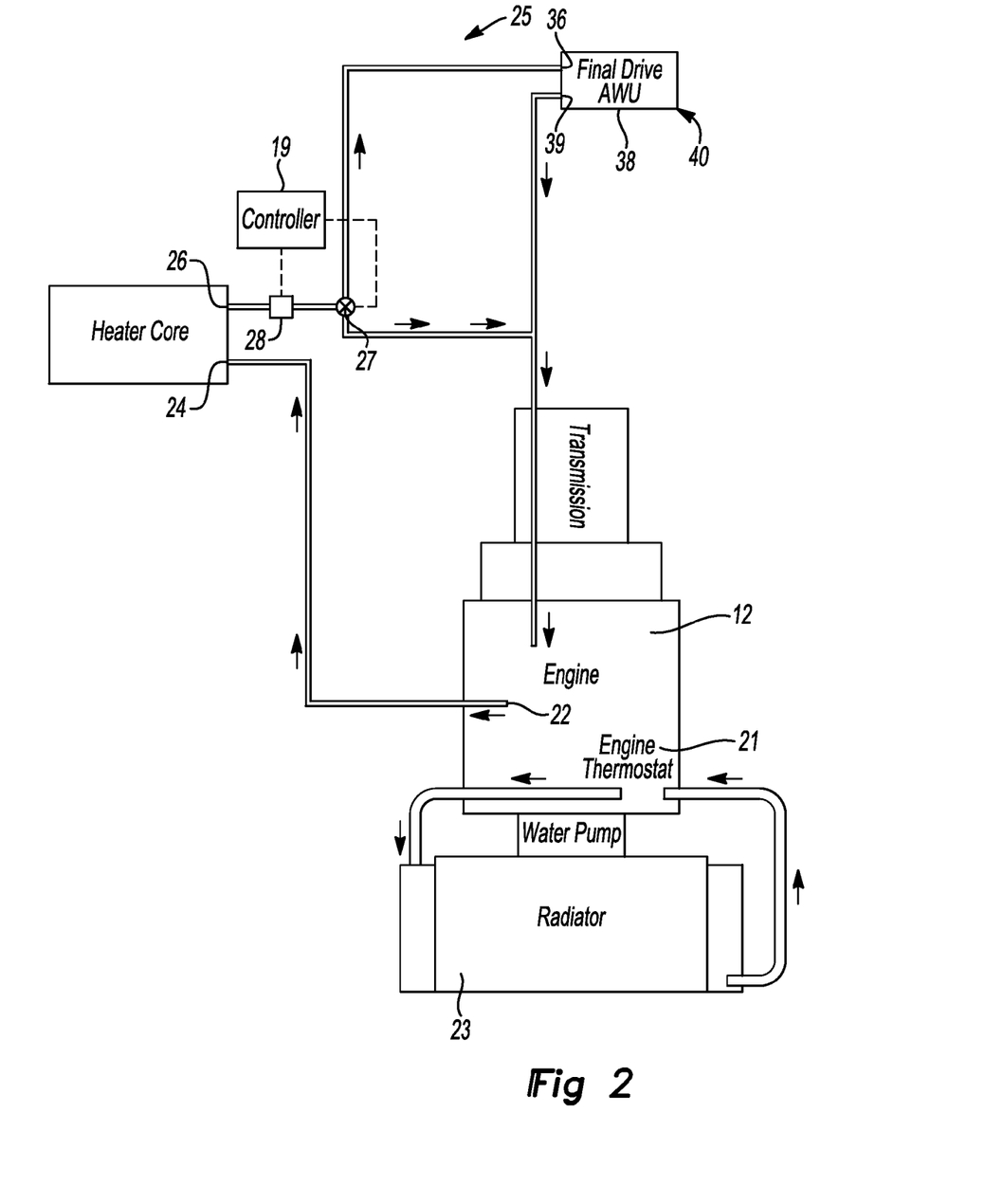
FIG. 2 is a fluid flow diagram depicting the flow of a coolant as a heat source.

Referring to FIG. 2, a fluid flow diagram depicting a heat source fluid circuit is shown. As stated above, the engine/transmission 12 produces excess heat. Some of the excess heat may then be transferred to an engine coolant. The temperature of the engine coolant may be monitored by an engine thermostat at 21. After passing the engine thermostat at 21, the engine coolant may be circulated through a radiator at 23. Circulating the engine coolant through the radiator at 23 aids to regulate the temperature of the coolant. At 22, the heated coolant from the engine/transmission 12 is pumped out of the engine/transmission 12. The heated coolant flows from the engine/transmission 12 at 22 and into a heater core at 24. The heater core provides heat to the passenger compartment and may also further regulate the temperature of the heated coolant. To provide passenger compartment heat as quickly as possible after engine start, coolant may be circulated to the heater core before the temperature of the coolant is high enough for the thermostat to circulate coolant to the radiator. At 26 coolant flows out of the heater core.

At 36, the coolant flows into an active warm-up system used for a final drive axle 38. The final drive axle 38 may include the differential 14, the ring gear 16 and the housing 40 associated with the differential 14, as described above. Therefore, the coolant at 36 may be used to heat the final drive axle 38, including the differential 14 and ring gear 16, through heating differential lubricating fluid within the housing 40. The differential lubricating fluid is used to lubricate essential axle components. The active warm-up of the final drive axle 38 and associated heat transfer from the heated coolant to the differential lubricating fluid is discussed in more detail below. After actively warming the differential lubricating fluid, as discussed below, the coolant is cycled back into the engine/transmission 12 at 39. While shown as a system to actively warm the differential lubricating fluids, a system to passively warm to the differential lubricating fluids may also be contemplated.

If, however, active warm-up of the differential is not appropriate based on the temperature of the coolant exiting the heater core at 26, a first bypass valve may be actuated at 27. A controller 19 may use control logic based on the temperature of the coolant exiting the heater core to actuate the first bypass valve at 27. The controller 19 may receive temperature signals of the coolant from a temperature sensor 28. When actuated, at 27, the first bypass valve may divert the coolant back to the engine/transmission 12. The first bypass valve is used to ensure that the coolant is at a suitable temperature to transfer heat to lubricating fluids of the axle.

Figure 3:
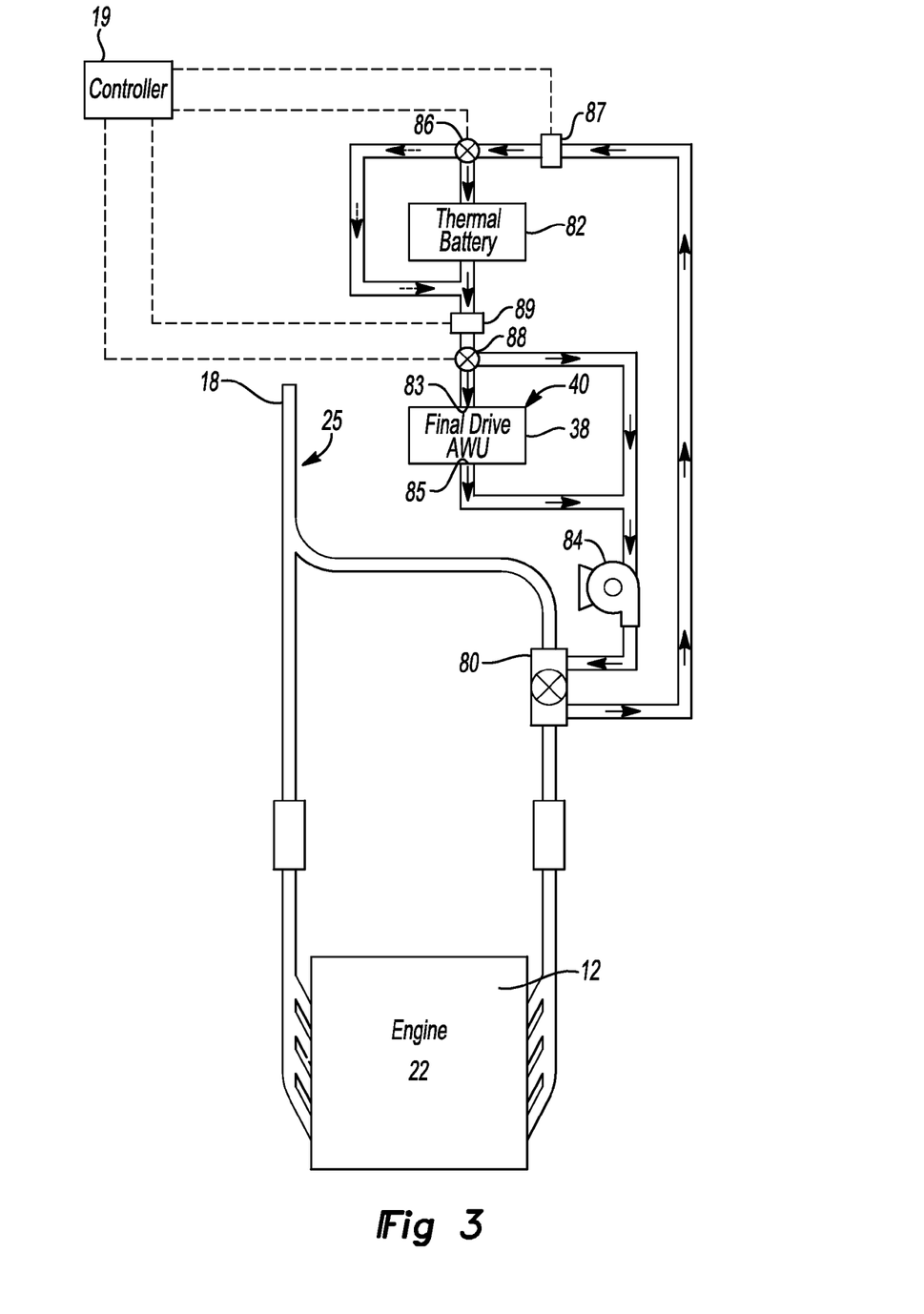
FIG. 3 is a fluid flow diagram depicting an exhaust system as a heat source.

Referring to FIG. 3, a fluid flow diagram depicting a heat source fluid circuit is shown. An engine exhaust system 18 may be used as a heat source 25 providing heat to the lubricating fluids of the final drive axle 38. The engine exhaust system 18 may also be coupled to a heat exchanger 80. For example, an exhaust system 18 may include a gas to liquid heat exchanger 80 for transferring heat from the exhaust system 18 to the final drive axle 38. The heat exchanger 80 may transfer heat to oil within the fluid circuit. The heated oil may feed a reservoir 82.

The reservoir 82 may be configured to store oil such that excess heat from the exhaust system 18 may be transferred to the oil and stored within the reservoir 82 for a given time. Storing excess heat energy within the oil allows the reservoir 82 to act as a thermal battery. For example, acting as a heat storage device, the reservoir 82 may retain heat even after the heat source, such as a vehicle exhaust system 18 is no longer producing heat. Oil may be defined as any fluid capable of storing excess heat energy allowing the reservoir 82 to act as a thermal battery. The oil may be pumped, via a pump 84, to the final drive axle 38. Therefore, the excess heat may be transferred from the oil within the reservoir 82 to the lubricating fluids for the final drive axle 38. Upon demand for heat to the final drive axle 38, the heated oil flows to the final drive axle 38.

A second bypass valve 86 directs the oil through the fluid circuit. The controller 19 may further utilize actuation control logic for ensuring the oil is leaving the second bypass valve 86 at an appropriate temperature. The controller 19 receives temperature signals from a temperature sensor 87. Based on the temperature signals, the controller 19 may actuate the second bypass valve 86. Actuation of the second bypass valve 86 controls the flow of the oil to the reservoir 82. If the temperature of the oil is below a threshold, the second bypass valve 86 may divert the oil around the reservoir 82. Likewise, if the temperature of the oil is above a threshold, the second bypass valve allows the oil to flow into the reservoir 82. Monitoring the temperature of the oil and controlling the flow of the oil based on the temperature allows for further control of the heat stored within the thermal battery.

A third bypass valve 88 may be actuated to control the flow of the heated oil to the final drive axle 38. Actuation of the third bypass valve 88 may further control the amount of heat to the final drive axle 38. For example, the controller 19 may receive temperature signals of the oil from a temperature sensor 89. If the temperature of the oil is below a threshold, the third bypass valve 88 may divert the oil around the final drive axle 38. Likewise, if the temperature of the oil is above a threshold, the third bypass valve 88 allows the oil to flow into the final drive axle 38. Controlling the flow of the oil into the final drive axle 38 based on the temperature of the oil further ensures proper warming of the final drive axle 38.

Figure 4:
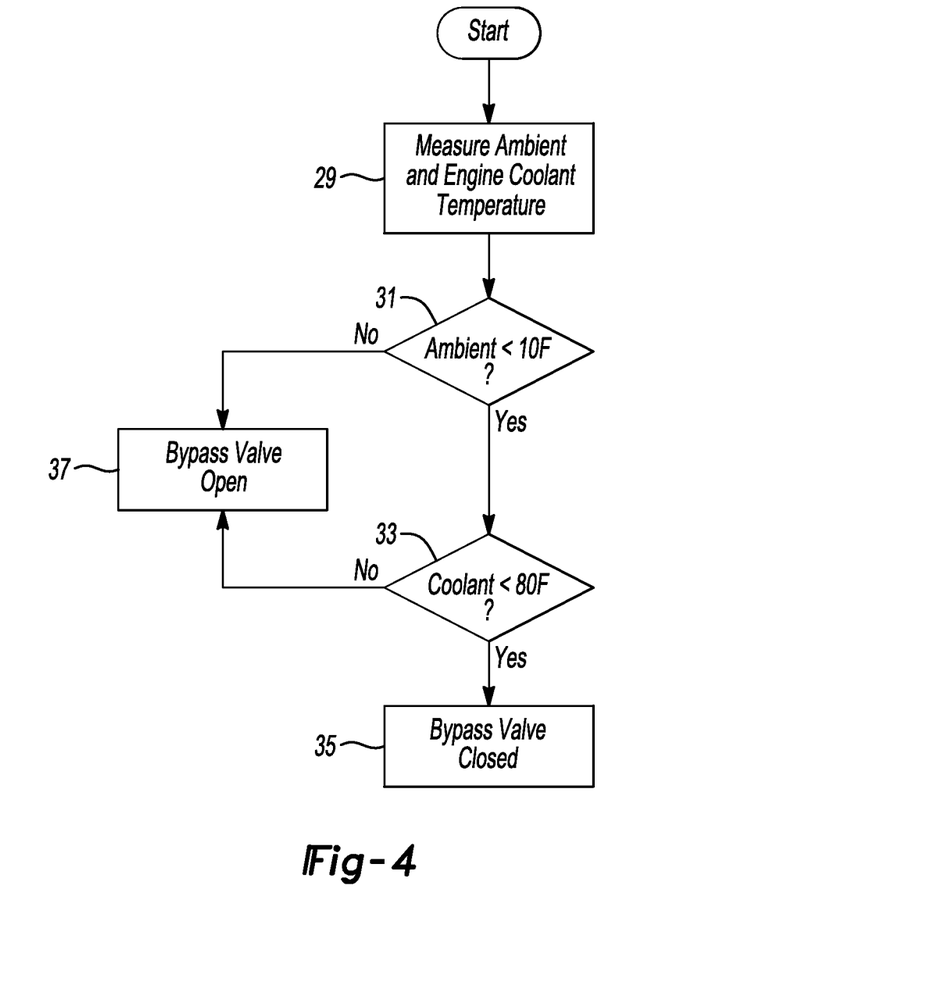
FIG. 4 is a flow diagram depicting control logic for a bypass valve.

Referring to FIG. 4, control logic for actuation of a bypass valve within a fluid circuit is shown. The bypass valve control logic may be executed on a vehicle controller capable of actuating the bypass valve to open or close. Further, the controller may be in communication with a plurality of sensors, such as temperature sensors to instruct actuation of the bypass valve. Using the engine coolant example in FIG. 2, a temperature sensor may communicate to the controller temperature signals of an ambient temperature of a passenger compartment and the engine coolant temperature at 29. As shown and discussed in FIG. 2 above, the temperature sensor may monitor the temperature of the coolant as it exits the heater core. The control logic may also be used to monitor the temperature of the thermal battery as described in FIG. 2.

Monitoring the temperature of the coolant after passing through the heater core further allows for regulation of the coolant temperature. For example, at 31, the controller may determine if the ambient temperature is below a threshold indicating that the passenger compartment is not sufficiently heated. If the ambient temperature is below a threshold at 31, then the controller may determine if the engine coolant is below a threshold, at 33. If the passenger compartment is not sufficiently heated at 31, the controller determines, at 33, the availability of the coolant to provide heat to the passenger compartment. The threshold of the ambient temperature may be approximately 10° F. and the threshold of the engine coolant may be approximately 80° F.

If the ambient or the engine coolant temperatures are below a threshold at 31 and 33 respectively, then the controller may close the bypass valve at 35. When the bypass valve is closed at 35 the engine coolant flows from the heater core back to the engine. Diverting the coolant back to the engine allows the coolant to absorb waste heat from the engine to improve heating performance of the passenger compartment. Closing the bypass valve at 35 prevents the engine coolant from flowing through the final drive axle and transferring heat to the lubricating fluid. The controller 19 may regulate the flow of the heated coolant to the heater core allowing the passenger compartment a priority for heat from the coolant over the final drive axle. However, if the controller determines that the ambient and the engine coolant temperatures are above the thresholds at 31 or 33, the controller may open the bypass valve at 37. Opening the bypass valve at 37 allows the heated engine coolant to flow from the heater core to the final drive axle, as described above. Controlling actuation of the bypass valve at 27 regulates coolant flow management as well as coolant temperature management.

Figure 5:
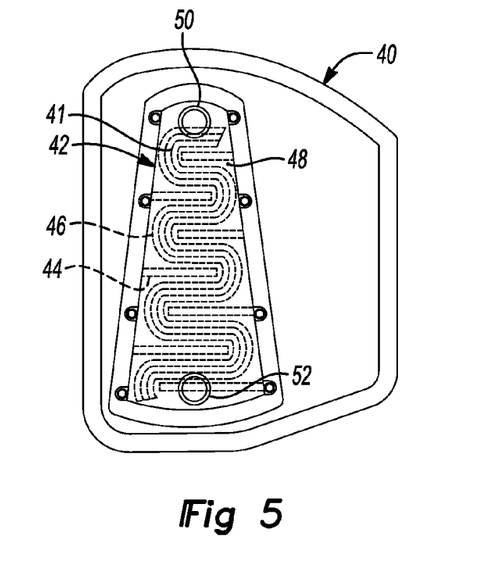
FIGS. 5-7 depict views of the differential housing with a heat exchanger.

Referring to FIG. 5, a back view of a rear differential housing 40 is shown. Molded with the rear differential housing 40 is a heat exchanger 42. This view shows a coolant side 41 of the heat exchanger 42. The coolant side 41 of the heat exchanger 42 is a side that receives the heated engine coolant from the cooling circuit as described in FIG. 2. The heat exchanger 42 transfers heat from a heat source (not shown), for example engine coolant or engine exhaust, to the differential lubricating fluid within the rear differential housing 40. In at least one embodiment, the heat source may be engine coolant heated from the excess heat from the engine. This is merely one example from which the heat exchanger 42 may transfer heat to the differential lubricating fluid. Other sources, such as engine exhaust, may also be used to transfer heat through the heat exchanger 42 to the differential lubricating fluid. Heat from the heat source, such as engine coolant, is derived by the fluid flow diagram as described in FIG. 2.

Figure 6:
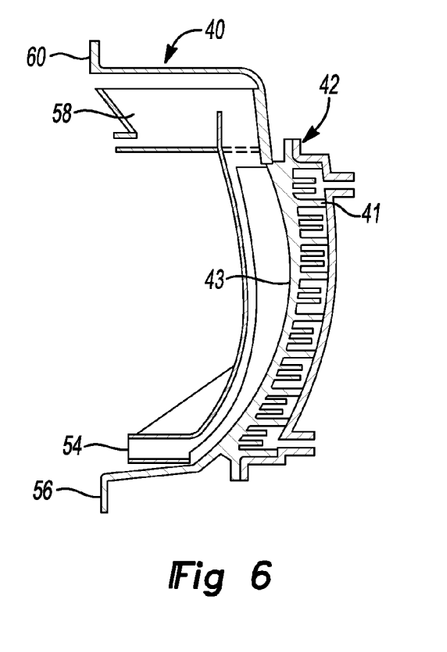
Figure 7:
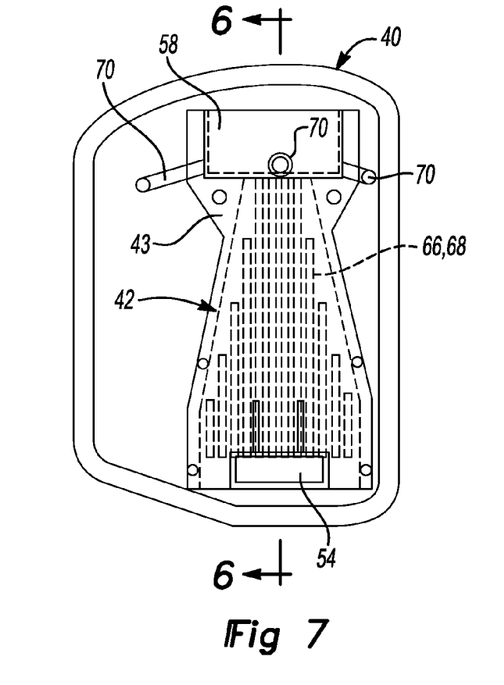

The heated engine coolant enters the heat exchanger 42 through an inlet port 50 on a coolant cover 48. The coolant cover 48 may be a polymer cover over the coolant side 41 of the heat exchanger 42. The coolant side 41 of the heat exchanger 42 may include baffles 44 and fins 46. The baffles 44 and the fins 46 help to direct the heated engine coolant through the heat exchanger 42. The heated engine coolant flows around the baffles 44 and is directed by the fins 46. The baffles 44 help to direct the flow of the coolant through the heat exchanger 42. The fins 46 increase the contact surface area between the coolant and the heat exchanger 42. The arrangement, size, and number of baffles 44 and fins 46 may vary depending on the amount of desired heat transfer. The baffles 44 and fins 46 arrangement as shown in FIGS. 5-7 are based on a liquid flowing through the coolant side 41 of the heat exchanger 42. However, the fins 46 may be rotated to cause the coolant to flow in a different direction. For example, in order to use air as a cooling source, the fins 46 may be parallel to the coolant side 41 of the heat exchanger 42.

Forcing the coolant to flow through a more circuitous path and increasing the contact surface area ensures that the heated coolant maintains contact with the heat exchanger 42 in order to transfer heat from the coolant to the differential lubricating fluid. The heated engine coolant, after flowing through the baffles 44 and the fins 46 of the heat exchanger 42, flows out of an outlet port 52 on the coolant cover 48. The heated engine coolant is then cycled through the fluid flow diagram as depicted and described in FIG. 2.

Using the heated engine coolant, or other heat source, such as engine exhaust to warm the differential lubricating fluid inside the differential housing 40 allows the differential lubricating fluid to warm quicker. This aids in controlling the viscosity differential lubricating fluid. Controlling the viscosity of the lubricating fluid helps achieve more efficient and optimal fluid flow management, as described above. Further, by controlling the viscosity of the lubricating fluid, the bearings, gears, and other driveline components may receive optimal lubrication at optimal temperatures. This helps to improve fuel economy, drivability, and durability of the vehicle driveline components.

FIG. 6 shows a side view of the differential housing 40 combined with the heat exchanger 42 shown. The differential housing 40 includes a scraper port 54 disposed at a first end 56 of the differential housing 40 and a reservoir 58 disposed at a second end 60 of the differential housing 40. The scraper port 54 and the reservoir 58 are disposed in an opposite relation on the differential housing 40. The scraper port 54 is disposed adjacent to a ring gear (not shown). As the ring gear spins, it acts as a pump pumping the differential lubricating fluid through the scraper port 54. Placing the scraper port 54 close to the ring gear reduces a sump fluid level and ensures a reduction of spin loss. The differential lubricating fluid is pumped through the differential housing 40 and into the reservoir 58. The reservoir 58 may hold approximately one liter of differential lubricating fluid.

Once the differential lubricating fluid reaches the reservoir 58, the warmed fluid is piped through a plurality of feeding ports 70 in order to lubricate the necessary axle components including the side bearings that support the differential and ring gear within the housing. The reservoir 58 may be disposed above the scraper port 54. Therefore, after the ring gear pumps the differential lubricating fluid through the scraper port 54 across the lubricant side 43 of the heat exchanger 42 and into the reservoir 58, gravity allows the differential lubricating fluid to flow through the plurality of feeding ports 70. If the ring gear pumps fluid into the reservoir faster than the fluid flows to axle components through ports 70, any excess spills out the top of the reservoir and flows back to the axle sump. This further reduces the losses associated with pumping the differential lubricating fluid. Using gravity to aid in piping the differential lubricating fluid through the plurality of feeding ports 70 reduces the force from the ring gear to pump the fluid to the vehicle components. Further, by using gravity, no additional components are needed to lubricate the vehicle components requiring lubrication. Avoiding the use of additional components helps maintain packaging space and lower overall vehicle costs associated with manufacturing and production. Controlling the viscosity of the lubricating fluid, through temperature management, also aids in optimizing flow management.

As the ring gear pumps the differential lubricating fluid through the scraper port 54, heat is transferred from the heat exchanger 42 to the differential lubricating fluid. As discussed above, heat is transferred from the heat source to the coolant side 41 of the heat exchanger 42. Heat from the coolant side 41 of the heat exchanger is conductively transferred to a lubricant side 43 of the heat exchanger. As the differential lubricating fluid flows through the differential housing 40 across the lubricant side 43 of the heat exchanger 42, heat is transferred to the differential lubricating fluid.

Referring to FIG. 7, a front view of the differential housing 40 with the attached heat exchanger 42 is shown. This view shows the lubricant side 43 of the heat exchanger 42. The lubricant side 43 of the heat exchanger 42 is separate from the coolant side 41 of the heat exchanger 42. This creates a separation between the engine coolant, or other heat source, and the differential lubricating fluid. The lubricant side 43 and the coolant side 41 of the heat exchanger 42 are sealed to prevent mixing of the coolant and the lubricating fluid.

As with the coolant side 41, the lubricant side 43 may include a plurality of baffles 66 and fins 68. As described above, the baffles 66 and fins 68 increase the contact surface area between the differential lubricating fluid and the lubricant side 43 of the heat exchanger 42. Increasing the contact surface area aids in regulating the amount of heat transferred, and as such the final temperature of the differential lubricating fluid. The amount of heat transfer to the differential lubricating fluid may be determined by the number, design, or type of the baffles 66 and fins 68 on the lubricant side 43 of the heat exchanger 42. The baffles 66 and fins 68 also aid in directing and controlling the flow of the lubricating fluid through the lubricant side 43 of the heat exchanger 42.

Heating only a portion of the differential lubricating fluid that is routed to the various components, as opposed to heating all of the fluid in the axle sump, results in a larger increase in temperature of the fluid directed to the components. Maintaining an optimal temperature controls the viscosity of the differential lubricating fluid. Controlling the viscosity of the differential lubricating fluid helps ensure adequate lubrication to the driveline components. As stated above, this reduces the wear on driveline components and increases durability and overall fuel economy of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle axle comprising:
    a housing having a cover and defining a sump containing a quantity of lubricating fluid, the cover forming a heat exchanger having a coolant side on an exterior of the housing and a lubricant side on an interior of the housing;
    a differential and a ring gear supported for rotation within the housing and configured to pump the quantity of lubricating fluid from the sump;
    a scraper port, disposed at a bottom of the heat exchanger adjacent to the ring gear and configured to direct the quantity of lubricating fluid through the lubricant side of the heat exchanger; and
    a reservoir, disposed at a top of the heat exchanger and configured to receive and store the quantity of lubricating fluid from the lubricant side of the heat exchanger.

2. The axle of claim 1, wherein the heat exchanger includes a plurality of baffles configured to direct a flow of a coolant through the coolant side of the heat exchanger.

3. The axle of claim 1, wherein the heat exchanger includes a plurality of fins configured to increase surface area of the coolant side of the heat exchanger.

4. The axle of claim 1, wherein the heat exchanger includes a plurality of fins configured to increase surface area of the lubricant side of the heat exchanger.

5. The axle of claim 1, further comprising a plurality of feeding ports configured to direct the lubricating fluid from the reservoir to side bearings.

6. A vehicle comprising:
    an axle housing having a cover forming a heat exchanger having a coolant side and a lubricant side;
    a differential and a ring gear configured to pump a lubricating fluid;

a scraper port, disposed at a bottom of the heat exchanger adjacent to the ring gear and configured to direct the lubricating fluid through the lubricant side of the heat exchanger; and a reservoir, disposed at a top of the heat exchanger, configured to receive and store the lubricating fluid from the lubricant side of the heat exchanger.

7. The vehicle of claim 6, further comprising a vehicle heater core fluidly coupled to the axle housing such that coolant from the heater core flows into the axle housing to provide a heat source to the axle housing.

8. The vehicle of claim 6, further comprising an engine having an exhaust system fluidly coupled to the axle housing such that gas from the exhaust system flows into the axle housing to provide a heat source to the axle.

9. The vehicle of claim 6, further comprising an engine fluidly coupled to the axle housing such that coolant from the engine flows into the axle housing to provide a heat source to the axle housing.

10. The vehicle of claim 9, further comprising:
a bypass valve configured to alternately fluidly connect and disconnect the heat source and the coolant side of the heat exchanger.

11. The vehicle of claim 10, further comprising:
a controller configured to adjust a state of the bypass valve based on a heat source temperature.

12. The vehicle of claim 6, wherein the axle housing is fluidly coupled to a cooling source.

13. The vehicle of claim 12, wherein the cooling source is ambient air.

14. A vehicle differential housing comprising:
a heat exchanger having a lubricant side and a coolant side having an inlet port and an outlet port;
a scraper configured to direct a lubricating fluid through the lubricant side of the heat exchanger; and
a reservoir configured to receive and store the lubricating fluid from the lubricant side of the heat exchanger.

15. The housing of claim 14, wherein the heat exchanger includes a plurality of baffles configured to direct a flow of a coolant through the coolant side of the heat exchanger.

16. The housing of claim 14, wherein the heat exchanger includes a plurality of fins configured to increase surface area of the coolant side of the heat exchanger.

17. The housing of claim 14, wherein the heat exchanger includes a plurality of fins configured to increase surface area of the lubricant side of the heat exchanger.

18. The housing of claim 14, wherein the reservoir holds more than 1 liter of fluid.

19. A method of actively warming a differential comprising:
in response to producing heat from a heat source fluidly coupled to a reservoir, heating oil disposed within the reservoir configured to store the heat within the oil; and
in response to a demand for heat from the differential, direct, via a valve, an amount of the oil to an inlet port of a differential housing wherein the oil transfers heat, via a heat exchanger fluidly coupled with the differential housing, to a lubricating fluid within the differential housing.

20. The method of claim 19 wherein the heat source is a vehicle exhaust system.

* * * * *